(12) United States Patent
Raszuk

(10) Patent No.: US 7,702,765 B1
(45) Date of Patent: Apr. 20, 2010

(54) TECHNIQUES FOR AUTOMATICALLY CREATING AN IBGP MESH

(75) Inventor: Robert Raszuk, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1485 days.

(21) Appl. No.: 10/791,630

(22) Filed: Mar. 1, 2004

(51) Int. Cl.
*G06F 15/173* (2006.01)
*H04L 12/26* (2006.01)

(52) U.S. Cl. .......... 709/223; 709/224; 709/237; 709/228; 709/229; 709/231; 709/232; 709/233; 709/234; 370/254; 370/389; 370/401; 370/216

(58) Field of Classification Search .......... 709/245, 709/223, 227–238; 370/235, 404
See application file for complete search history.

(56) References Cited

U.S. PATENT DOCUMENTS

| | | | |
|---|---|---|---|
| 5,953,312 A | 9/1999 | Crawley et al. | 370/218 |
| 6,055,561 A | 4/2000 | Feldman et al. | 709/200 |
| 6,574,195 B2 | 6/2003 | Roberts | 370/235 |
| 6,604,146 B1 | 8/2003 | Rempe et al. | 709/238 |
| 6,609,153 B1 | 8/2003 | Salkewicz | 709/223 |
| 6,611,872 B1 | 8/2003 | McCanne | 709/238 |
| 6,647,428 B1 * | 11/2003 | Bannai et al. | 709/245 |
| 6,683,865 B1 | 1/2004 | Garcia-Luna-Aceves | 370/349 |
| 6,693,909 B1 | 2/2004 | Mo et al. | 370/392 |
| 6,963,575 B1 * | 11/2005 | Sistanizadeh et al. | 370/404 |
| 7,120,792 B1 * | 10/2006 | Jacobson et al. | 713/153 |
| 2003/0039212 A1 * | 2/2003 | Lloyd et al. | 370/235 |
| 2005/0097203 A1 * | 5/2005 | Unbehagen et al. | 709/223 |

* cited by examiner

*Primary Examiner*—Jude J Jean Gilles
(74) *Attorney, Agent, or Firm*—Cindy Kaplan

(57) ABSTRACT

Techniques for automatically creating a BGP mesh, and more specifically, an iBGP mesh, are provided. Peering information is flooded to routers within a network AS. The peering information is analyzed and a list of neighbors is created. BGP sessions are then performed with the neighbors to establish the BGP mesh.

25 Claims, 8 Drawing Sheets

```
431
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |           RESERVED            |
+-+-+-+-+-+-+-+-+-+-+-+-+-+-+-+-+-+-+-+-+-+-+-+-+-+-+-+-+-+-+-+-+
|                             Value                             |
+-+-+-+-+-+-+-+-+-+-+-+-+-+-+-+-+-+-+-+-+-+-+-+-+-+-+-+-+-+-+-+-+
```

FIG. 5

```
441
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |         RESERVED            |F|
+-+-+-+-+-+-+-+-+-+-+-+-+-+-+-+-+-+-+-+-+-+-+-+-+-+-+-+-+-+-+-+-+
|                       IPv4 Peering Address                    |
+-+-+-+-+-+-+-+-+-+-+-+-+-+-+-+-+-+-+-+-+-+-+-+-+-+-+-+-+-+-+-+-+
```

FIG. 6A

```
451
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |         RESERVED            |F|
+-+-+-+-+-+-+-+-+-+-+-+-+-+-+-+-+-+-+-+-+-+-+-+-+-+-+-+-+-+-+-+-+
|                                                               |
|                                                               |
|                       IPv6 Peering Address                    |
|                                                               |
|                                                               |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |            RESERVED           |
+-+-+-+-+-+-+-+-+-+-+-+-+-+-+-+-+-+-+-+-+-+-+-+-+-+-+-+-+-+-+-+-+
|  Address Family Identifier 1  |    SAFI 1     |  RESERVED  |O|
+-+-+-+-+-+-+-+-+-+-+-+-+-+-+-+-+-+-+-+-+-+-+-+-+-+-+-+-+-+-+-+-+
                              .....
+-+-+-+-+-+-+-+-+-+-+-+-+-+-+-+-+-+-+-+-+-+-+-+-+-+-+-+-+-+-+-+-+
|  Address Family Identifier 1  |    SAFI 2     |  RESERVED  |O|
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |            RESERVED           |
+-+-+-+-+-+-+-+-+-+-+-+-+-+-+-+-+-+-+-+-+-+-+-+-+-+-+-+-+-+-+-+-+
|  Address Family Identifier N  |    SAFI N     | RESERVED |R|O|
+-+-+-+-+-+-+-+-+-+-+-+-+-+-+-+-+-+-+-+-+-+-+-+-+-+-+-+-+-+-+-+-+
|                         Cluster ID  N                         |
+-+-+-+-+-+-+-+-+-+-+-+-+-+-+-+-+-+-+-+-+-+-+-+-+-+-+-+-+-+-+-+-+
                              ......
+-+-+-+-+-+-+-+-+-+-+-+-+-+-+-+-+-+-+-+-+-+-+-+-+-+-+-+-+-+-+-+-+
|  Address Family Identifier X  |    SAFI X     | RESERVED |R|O|
+-+-+-+-+-+-+-+-+-+-+-+-+-+-+-+-+-+-+-+-+-+-+-+-+-+-+-+-+-+-+-+-+
|                         Cluster ID  X                         |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |            RESERVED           |
+-+-+-+-+-+-+-+-+-+-+-+-+-+-+-+-+-+-+-+-+-+-+-+-+-+-+-+-+-+-+-+-+
|                        Old BGP Identifier                     |
+-+-+-+-+-+-+-+-+-+-+-+-+-+-+-+-+-+-+-+-+-+-+-+-+-+-+-+-+-+-+-+-+
```

FIG. 6E

TECHNIQUES FOR AUTOMATICALLY CREATING AN IBGP MESH

BACKGROUND OF THE INVENTION

The present invention relates to networks. More specifically, the invention relates to techniques for creating iBGP meshes in networks.

The Border Gateway Protocol (BGP) is a routing protocol for the Internet Protocol (IP). As such, BGP is used extensively in routers on the Internet. In general, the goal of a routing protocol in networks is to ensure that information can be sent between network devices (including computers) in the network.

The distribution of BGP routing information within an autonomous system (AS) typically requires all routers to be fully meshed. In order to establish a full mesh, each BGP speaker (e.g., router or route reflector) is manually configured with the identities of its neighbors. A router then establishes a transmission control protocol (TCP) session and exchanges BGP messages to convey routing information.

Because the routers are manually configured, establishing a full mesh constitutes a significant operational problem in terms of configuration management. This has led to the widespread adoption of route reflection, primarily in order to reduce the number of systems which configuration must be modified in order to introduce or remove a new internal BGP speaker.

Route reflectors have met with great success and have proliferated throughout the Internet. A route reflector advertises routing information to its clients (also called route reflector clients). Although route reflection can help ease the burden of configuration management, route reflection implies with it information reduction, which is not always desired. For example, route reflectors may not allow multiple paths to an edge router as the route reflector will send the "best" path.

Another solution to ease configuration management are AS confederations. Basically, an AS configuration is an AS that has been split into multiple sub-ASs. By reducing the number of entities at the AS level, configuration management is simplified at that level. AS confederations can aid in configuration management, but it comes at a cost of setting up and maintaining a more complicated hierarchy.

It would be beneficial to have a discovery mechanism that is designed to address the problem of introducing (or removing) a BGP speaker into a BGP mesh without implying any other behavior change when compared to manual configuration. Additionally, it would be beneficial if the discovery mechanism worked automatically and seamlessly with existing protocols and network configurations, including those with route reflectors and AS confederations.

SUMMARY OF THE INVENTION

The present invention provides innovative techniques for automatically creating a BGP mesh, and more specifically, an iBGP mesh. In general, peering information is flooded to network devices (e.g., routers) within a network AS. The peering information is analyzed and a list of neighbors is created. BGP sessions are then performed with the neighbors to establish the BGP mesh. Some specific embodiments of the invention are described below.

In one embodiment, the invention provides a method of establishing a BGP mesh in a network. BGP peering information is flooded from a network device to at least one other network device. The other network device receives the BGP peering information and analyzing the BGP peering information to identify at least one neighbor. For example, the at least one neighbor can be utilized to verify a manual configuration.

In another embodiment, the invention provides a method of establishing a BGP mesh in a network. BGP peering information is received from a network device. The BGP peering information is analyzed to identify at least one neighbor. A BGP session is performed with the a neighbor to establish a BGP mesh. In preferred embodiments, the BGP mesh is an iBGP mesh.

In another embodiment, the invention provides a method of establishing an iBGP mesh in a network. iBGP peering information is flooded from a network device to at least one other network device. The other network device receives the iBGP peering information and analyzes the BGP peering information to identify at least one neighbor. An iBGP session is performed with a neighbor to establish an iBGP mesh. In some embodiments, the iBGP peering information is static information.

Other features and advantages of the invention will become readily apparent upon review of the following description in association with the accompanying drawings, where the same or similar structures are designated with the same reference numerals.

BRIEF DESCRIPTION OF THE DRAWINGS

FIG. 5 illustrates an example of the structure of sub-information that can be included relating to AS numbers and confederation sub-ASs.

FIGS. 6A and 6B show examples of the structure of sub-information relating to peering addresses.

FIGS. 6C and 6D show examples of the structure of sub-information relating to the AFI/SAFI for mesh topologies and those using route reflectors.

FIG. 6E shows an example of the structure of sub-information relating to specifying an old BGP identifier.

DETAILED DESCRIPTION OF EMBODIMENTS

In the description that follows, the present invention will be described in reference to embodiments that are used in association with BGP version 4. However, embodiments of the invention are not limited to any particular version, protocol, environment, application, or implementation. For example, although embodiments of the invention will be described in reference to flooding peering information using OSPF or ISIS, any flooding protocol can be utilized. Therefore, the description of the embodiments that follows is for purposes of illustration and not limitation.

Figure 1A:
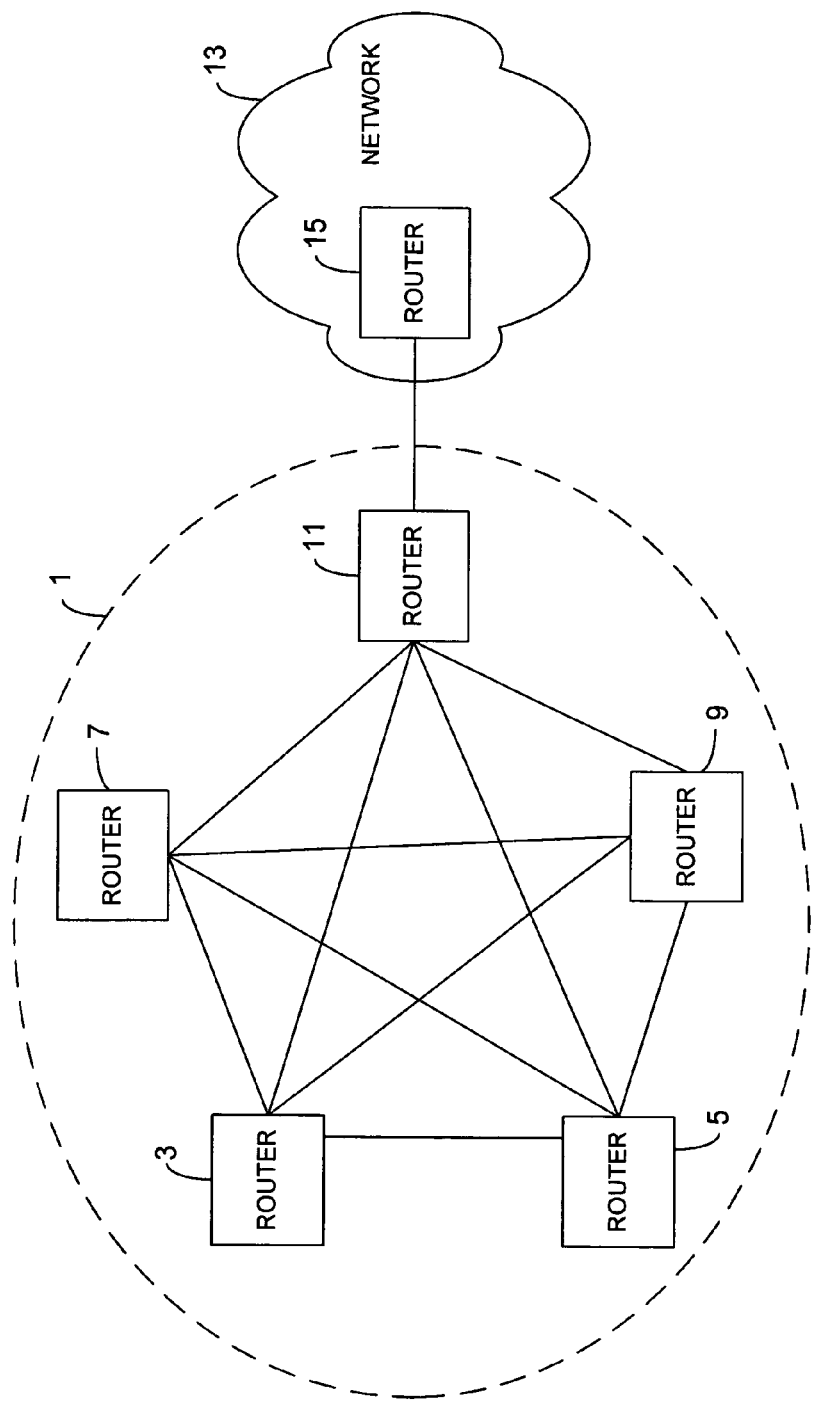
FIG. 1A shows a block diagram of a full BGP mesh in an AS in communication with another network.

BGP is a routing protocol for the IP networks. The routing information can include address prefixes, next hops, attributes (e.g., originator flags), and other information that allow packets to reach their intended destination on the network. FIG. 1A shows a block diagram of a full BGP mesh in an AS in communication with another network.

An AS 1 is shown including routers 3, 5, 7, 9, and 11. The routers in AS 1 have established a full BGP mesh as indicated by the lines between them. The lines represent BGP sessions between the routers to share routing information and does not reflect physical connections between the routers.

Internal BGP (iBGP) is the protocol that is utilized between routers in an AS, such as those shown in AS 1. A network 13 including router 15 is in communication with AS 1. As routers 11 and 15 are in different ASs, external BGP (eBGP) is the protocol that is utilized between these routers. More information on BGP can be found in "BGP4 Inter-Domain Routing in the Internet," John W. Stewart III, Addison-Wesley, 1999, which is hereby incorporated by reference for all purposes.

If a network administrator wished to add a router or BGP speaker to AS 1, the router would need to be manually configured to know the identity of its neighbors in AS 1. The new router would then perform BGP sessions with its neighbors in order to communicate routing information and establish a BGP mesh.

One of the most common complaints received from operators is the comment on complexities associated with the configuration of BGP meshes. Embodiments of the invention provide an auto discovery of internal BGP peers via configuration information flooding as well as a set of procedures which would allow to establish iBGP sessions automatically.

Figure 1B:
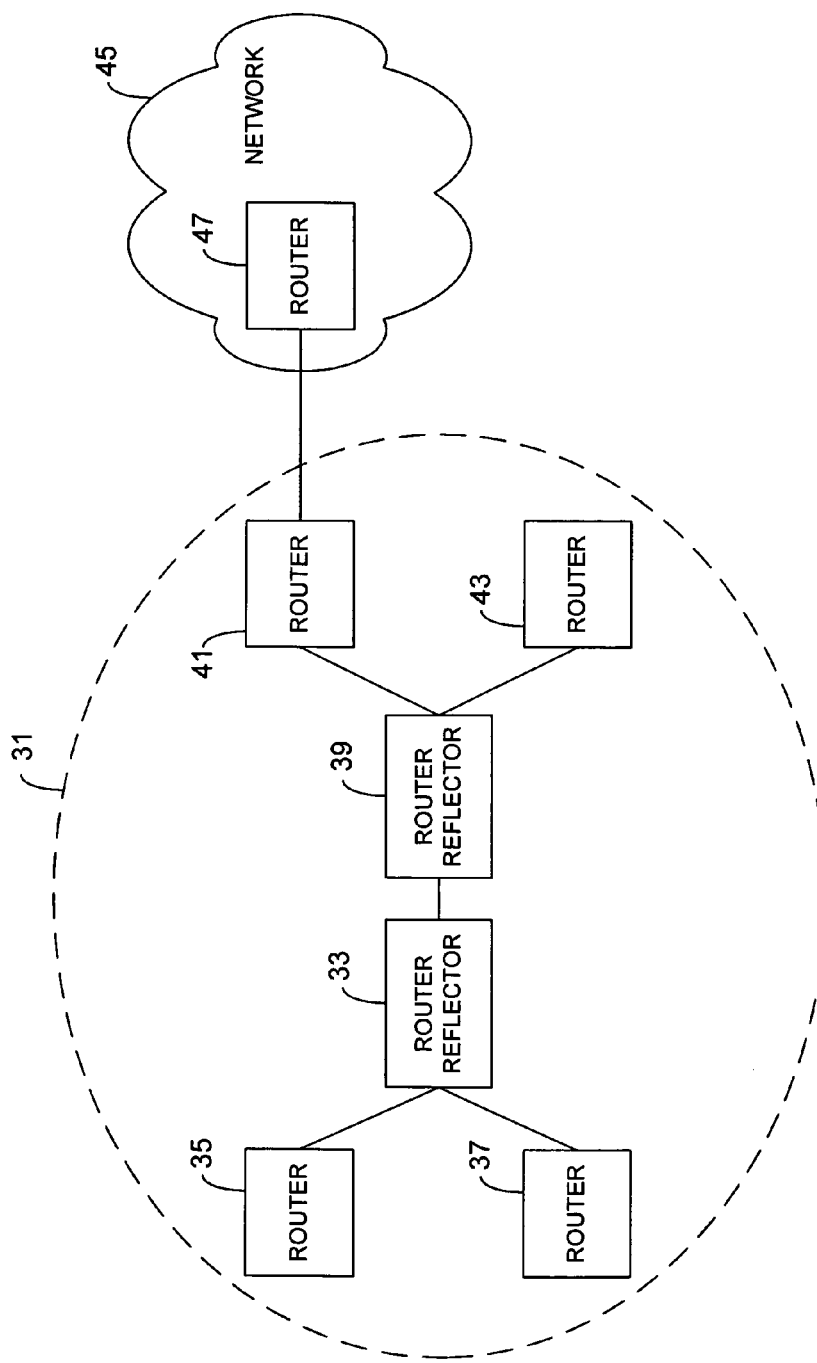
FIG. 1B shows a block diagram of an AS including route reflectors in communication with another network.

The network show in FIG. 1A is one example that can advantageously utilize the invention. Other network configurations can benefit as well. For example, FIG. 1B shows a block diagram of an AS including route reflectors in communication with another network.

AS 31 includes routers and route reflectors. Route reflector 33 has routers 35 and 37 as route reflector clients (where the router and route reflector clients are also known as a cluster). Similarly, route reflector 39 has routers 41 and 43 as route reflector clients. As is known, route reflectors can simply the manual configuration of a BGP mesh.

AS 31 is in communication with network 45, which includes router 47. iBGP sessions are performed between BGP speakers in AS 31 and eBGP sessions are performed between routers 41 and 47.

Figure 1C:
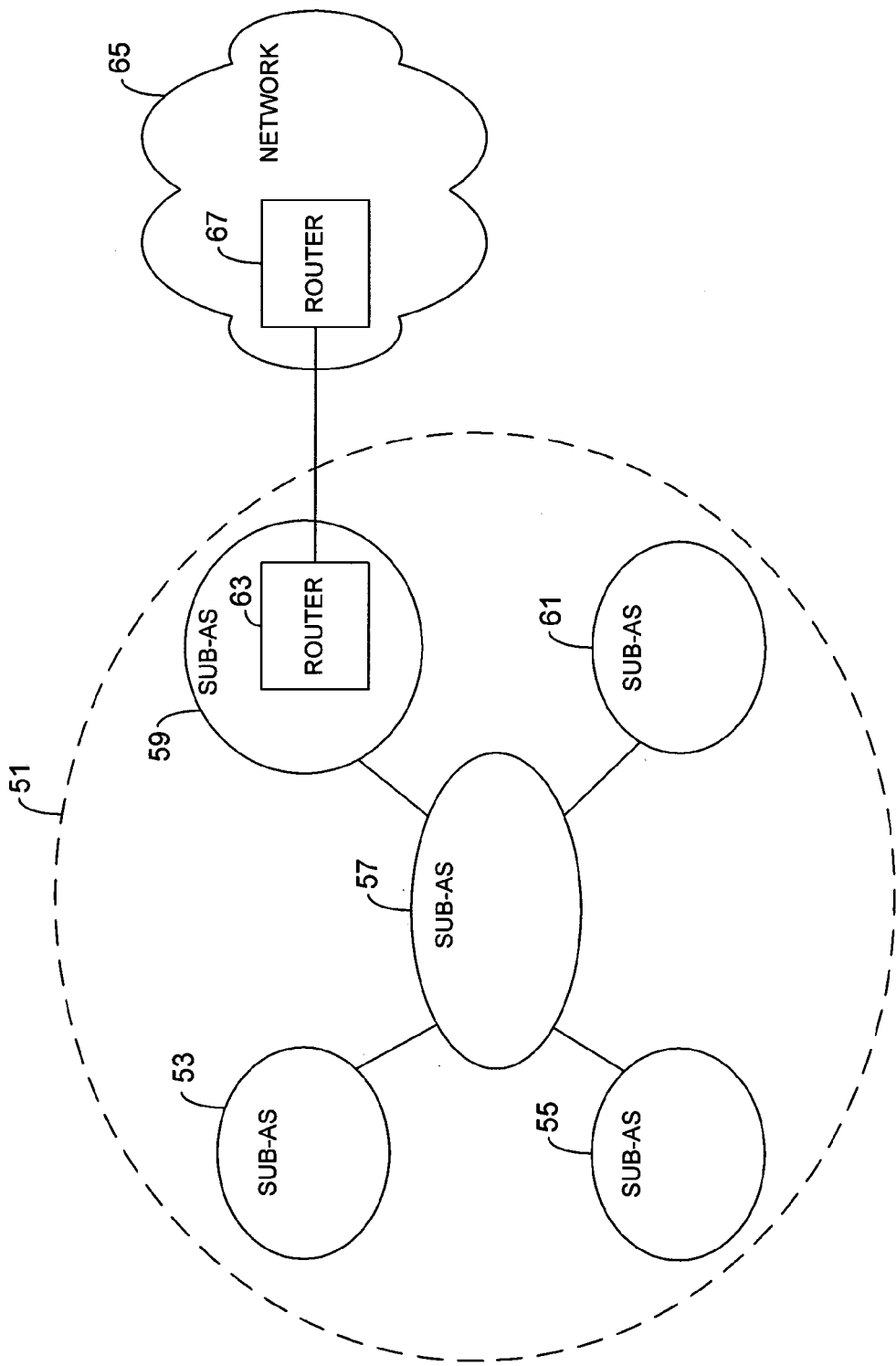
FIG. 1C shows a block diagram of an AS confederation in communication with another network.

As another example, FIG. 1C shows a block diagram of an AS confederation in communication with another network. AS confederation 51 includes sub-ASs 53, 55, 57, 59, and 61. Sub-AS 63 includes router 63. Each sub-AS typically includes a full mesh between BGP speakers within the sub-AS. Once again, AS confederations can simply the manual configuration of a BGP mesh.

AS confederation 51 is in communication with network 65, which includes router 67. eBGP sessions are performed between routers 41 and 47. iBGP sessions are performed between BGP speakers in sub-ASs in AS confederation 51, but slightly different BGP sessions (sometimes called eiBGP sessions) are performed between BGP speakers from different sub-ASs.

FIGS. 1A, 1B and 1C are provided to illustrate examples of network configurations that can be utilized with the invention. However, these network configurations are for illustrative purposes as the invention can be applied to many other configurations.

Figure 2:
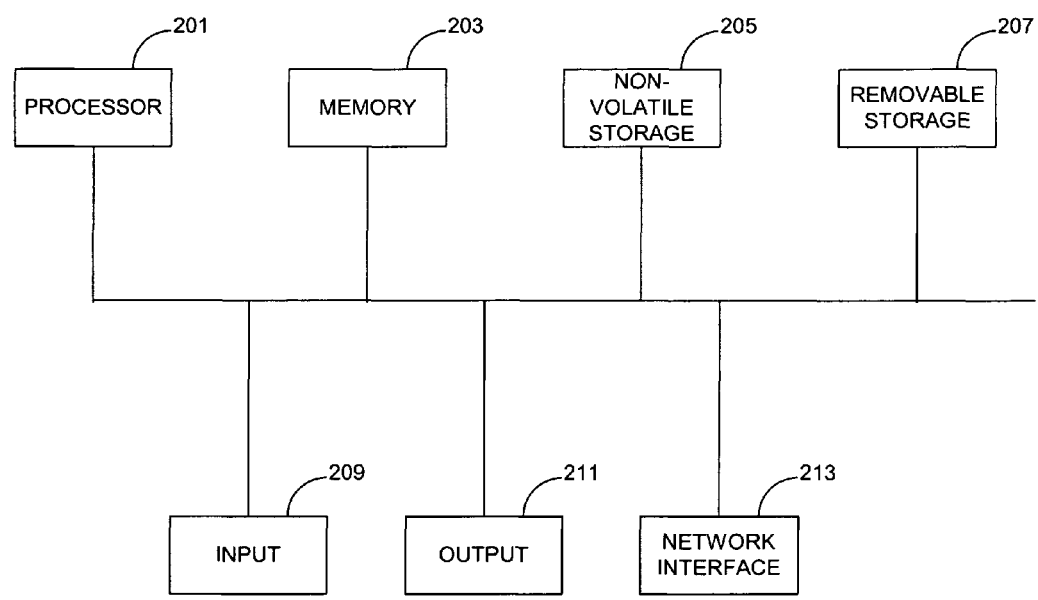
FIG. 2 illustrates a block diagram of a network device, computer system or subsystems thereof that can utilize embodiments of the invention.

Now that exemplary networks have been described, FIG. 2 shows a block diagram of components that can be present in network devices and computer systems that implement embodiments of the invention. A processor 201 executes code (or instructions) that direct the operation of the processor. Although processors typically have memory caches, processor 201 utilizes memory 203, which can store code and data.

A non-volatile storage 205 can store code and data such that it is typically persistent and provides more storage when compared to memory 203. At present, a common non-volatile storage is one or more hard drives. A removable storage 207 provides mobility to code and/or data that are stored thereon. Examples of removable storage are floppy disks, tape, CD/ROM, flash memory devices, and the like.

Memory 203, non-volatile storage 205 and removable storage 207 provide examples of computer readable storage media that can be utilized to store and retrieve computer programs incorporating codes that implement the invention, data for use with the invention, and the like. Additionally, a data signal embodied in a carrier wave (e.g., in a network including the Internet) can be the computer readable storage medium. An input 209 allows a user to interface with the system. Input can be done through the use of a keyboard, a mouse, buttons, dials, or any other input mechanism. An output 211 allows the system to provide output to the user. Output can be provided through a monitor, display screen, LEDs, printer or any other output mechanism. Input and/or output can also be performed externally through a network interface 213.

Network interface 213 allows the system to interface with a network to which it is connected. The components shown in FIG. 2 can be found in many network devices and computer systems. However, components can be added, deleted and combined so FIG. 2 is for illustration purposes. Additionally, these components can also be present on subsystems (e.g., cards) in network devices and computer systems.

Figure 3:
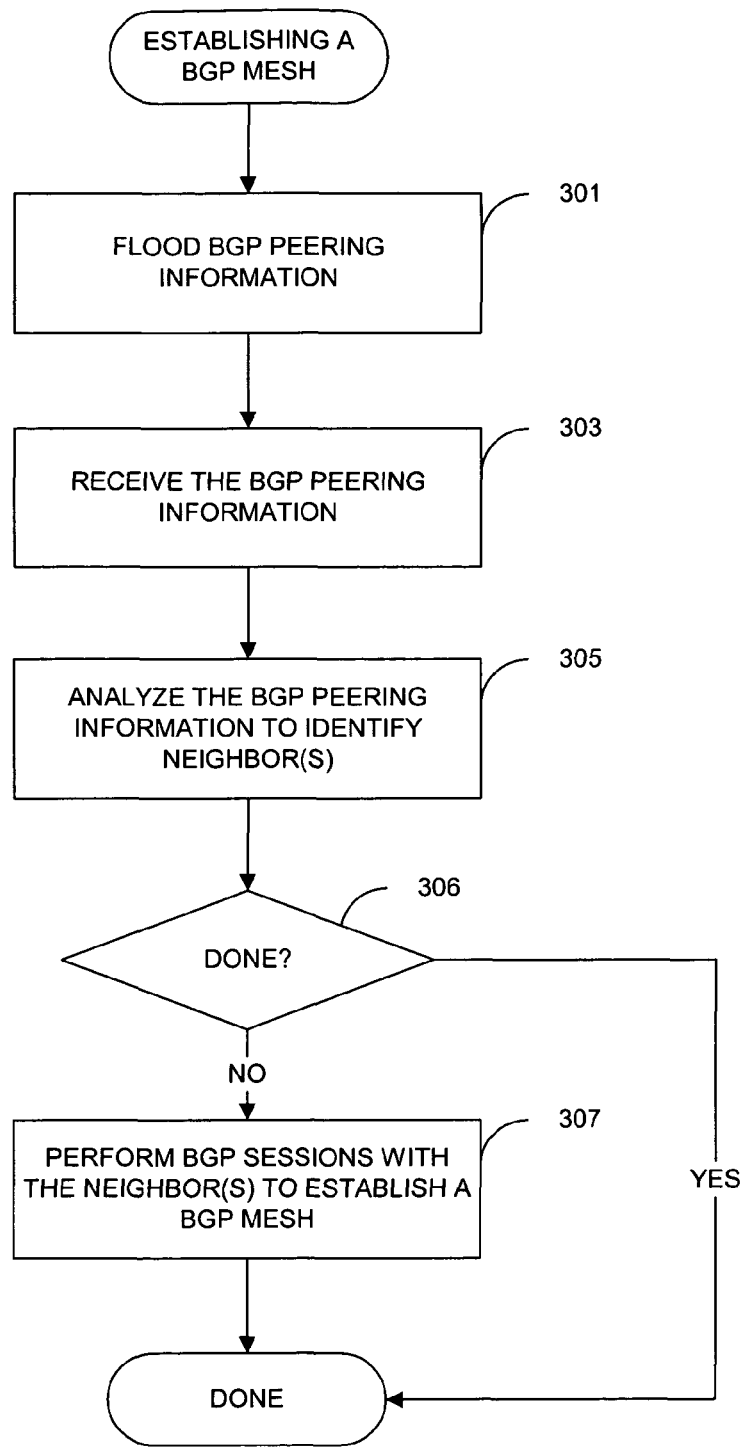
FIG. 3 shows a flowchart of a process of establishing a BGP mesh according to one embodiment of the invention.

Now that hardware systems and devices have been described, FIG. 3 shows a flowchart of a process of establishing a BGP mesh according to one embodiment of the invention. The flowchart is shown for illustrative purposes as steps can be added, deleted, combined, and reordered without departing from the spirit and scope of the invention.

At a step 301, a BGP speaker floods BGP peering information, such as iBGP information for peers. The peering information is typically static information that is flooded to other BGP speakers. Flooding algorithms attempt to distribute information to every node in an efficient manner without unnecessarily sending the information to a node multiple times.

In some embodiments, the BGP peering information is piggybacked on top of existing IGP mechanisms. The invention is designed with flooding mechanism transparency in mind. Thus, the invention will work advantageously with new and more effective flooding protocols that are introduced and deployed in the future.

For example, BGP auto discovery can be carried in OSPF Router Information LSA or ISIS LSP. Thus, although ISIS and OSPF for flooding is mostly based on the fact that those protocols already have a flooding mechanism which can be reused for the purpose of required in this proposal information distribution.

The BGP peering information is received by other network devices at a step 303. At a step 305, the BGP peering information is analyzed to identify one or more neighbors. For example, the analysis can result in the generation of a list of neighbors that can be passed to a process for performing BGP sessions with the neighbors.

In some embodiments, the peering information can be analyzed to verify a manual configuration. The peering information can be analyzed to determine per AFI/SAFI the other BGP speakers that should be peered with from a certain routers point of view. This can then be compared to the manual configuration to determine if it is correct. Thus, the flow can be determined to be done at a step 306.

At a step 307, BGP sessions are performed with the neighbors of the network device in order to establish a BGP mesh. A TCP connection is typically utilized to perform a BGP session and exchange routing information.

As mentioned above, the flow of the flowchart in FIG. 3 can be varied depending on the application. Another example is that the flow for a BGP speaker that receives BGP peering information would begin at step 303. Thus, the flowchart is not limited to any specific flow.

Figure 4:
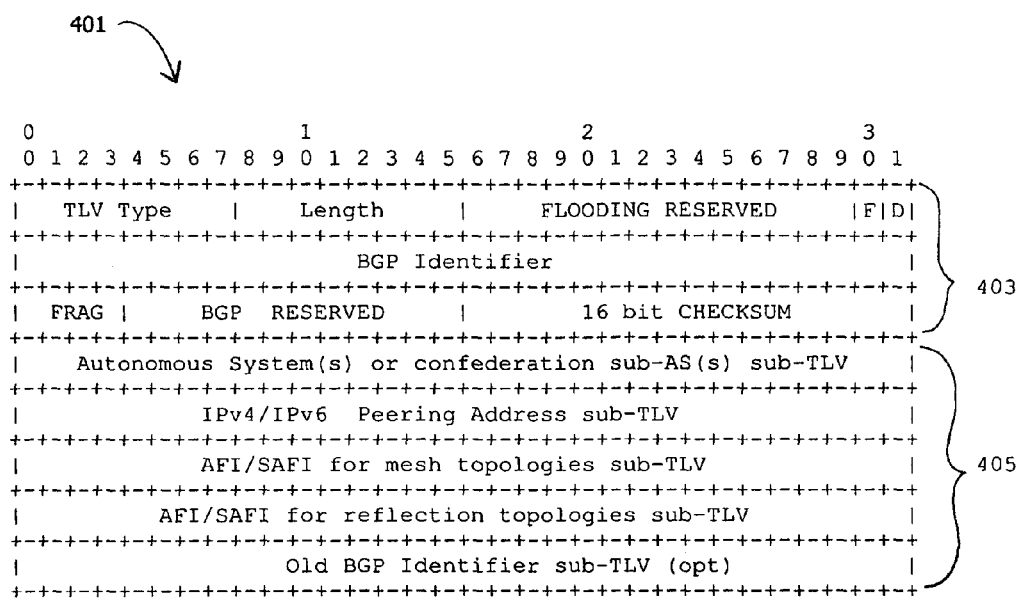
FIG. 4 illustrates an example the structure and peering information that can be flooded to neighboring routers to establish a BGP mesh.

Now that the operation of embodiments has been described, examples of the BGP peering information format will be discussed. FIG. 4 illustrates an example the structure and peering information that can be flooded to neighboring routers to establish a BGP mesh. The specific structure and associated information is shown is designed for IP version 4 and version 6. However, this is for illustrative purposes as the invention is not limited to any specific embodiment.

BGP peering information (or TLV) 401 includes multiple octets. The TLV type indicates the flooding scope. For example, with OSPF, the flooding could be indicated as area scope or domain wide scope depending on the configuration. With ISIS, the flooding scope could be local to the intra area or domain wide.

It is a strong design goal that flooding of BGP Auto Discovery TLV can be realized over any other protocol when such is deployed and when it can provide further benefits. For example, selective groups of destinations or disjoined information distribution trees per AFI/SAFI can be accommodated with the invention. In cases of multiple BGP processes running on a router each BGP process should send it's own BGP Auto Discovery TLV with a different BGP Identifier.

The Length is the total length in octets of this TLV. In one embodiment, the minimum TLV length can be 10 octets. When a size of the TLV reaches 255 octets TLV fragmentation can occur. A Frag bit counter has been allocated in the third four octets for unlikely cases where BGP Auto Discovery TLV needs to be split across multiple TLVs for a given BGP speaker. It is estimated that the average size of BGP auto discovery TLV in today's production environments will be anywhere from 30-50 octets.

A couple of global flooding flags are shown in the first four octets: F and D. The F flag relates to flooding scope. When set, domain wide flooding scope is required, when not set TLV should not be flooded into other areas or levels. The default can be not set indicating area/level wide flooding only. The D flag is a down bit set by ISIS when leaked to other areas/levels.

The BGP identifier contains the four octet BGP identifier to which the TLV relates. Depending on the flooding protocol being utilized BGP may be receiving identical information periodically. To allow easy determination if the content of the TLV has changed for a given BGP identifier, a 16 bit Checksum has been defined. The Checksum can be computed from the content of the entire BGP Auto Discovery TLV (before potential fragmentation) excluding the first 4 octets of the TLV.

As shown, some of the bits are shown as reserved for future use. Typically, the reserved bits should be set to zero.

TLV 401 includes a header 403 and sub-information (or sub-TLVs) 405. Header 403 includes information that is generally common to all situations, whereas the sub-TLVs contain information for different BGP operations. Accordingly, there may be one or more sub-TLVs depending on the situation.

When an advertised BGP Auto Discovery TLV for a given BGP identifier does not contain any sub-TLVs, it should be interpreted as an implicit withdraw of any previously advertised BGP Auto Discovery TLV for a given BGP identifier. BGP operations in session establishment to auto discovered peers should remain without any changes.

FIG. 5 illustrates an example of the structure of sub-information (or sub-TLV) that can be included relating to AS numbers and confederation sub-ASs. A sub-TLV 431 is for BGP Autonomous Systems information.

The Type specifies this sub-TLV and is set to 1 in one embodiment. The Length is a one octet field that indicates the length of the sub-TLV in octets.

The Value is a four octet BGP Autonomous System number (s) or confederation sub-AS. The Reserved is a two octet field reserved for flags and sub-TLV control. Typically Advertising multiple autonomous system numbers may be required during AS renumbering and merges with other ASes. Therefore this embodiment does not limit advertisement to a single AS value per BGP speaker.

The peering attempt should be made only to those peers which match locally configured AS number or numbers (multi-AS migration case). When a confederation is used, sub-AS will limit the scope of full mesh peering only to a given sub-AS even if flooding scope is common to all sub-ASes. Usage of route reflectors within each confederation sub-AS is also supported.

FIGS. 6A and 6B show examples of the structure of sub-information relating to peering addresses. Referring to FIG. 6A, a sub-TLV is for IP version 4 peering addresses.

The Type is a one octet field set to value of 2 to identify this sub-TLV. The Length is a one octet field that indicates the length of this sub-TLV in octets.

The F flag is utilized to force new peering when set. The default value can be not set. The following four octets is a IPv4 peering address. This address will be used by BGP speakers as a destination in a BGP Open message. Sending a BGP Auto Discovery TLV with new peering address is an explicit withdraw of the previously advertised one.

When such a messages is received old peering should remain intact when the F flag is not set (default). When session is cleared manually or IGP reachability to the old peering address disappears new peering address should be used. When the F flag is set, new peering address should be used immediately and current BGP session to the peer restarted.

In FIG. 6B, a sub-TLV 451 is for IP version 6 peering addresses. Sub-TLV 451 is the same as sub-TLV 441 except that the Type is set to a value of 3 and there is a 16 octet Ipv6 peering address. When both IPv4 and IPv6 peering addresses are present it can be up to the implementation to decide on the peering address selection.

FIGS. 6C and 6D show examples of the structure of sub-information relating to the AFI/SAFI for mesh topologies and those using route reflectors. Referring to FIG. 6C, a sub-TLV 461 is shown for AFI/SAFI for mesh topologies.

The Type is a one octet field set to value of 4. The Length is a one octet field that indicates the length of this sub-TLV in octets. Each subsequent four octets includes a two octet Address Family Identifier, one octet Subsequent Address Family Identifier and one octet for AFI/SAFI flags.

For example, an O flag (or bit) can indicate an originator or eBGP speaker if set. iBGP sessions in a full or partial mesh topology are required to directly peer with those BGP speakers which originate routes or which maintain eBGP sessions. The O flag should be used to mark such a BGP speaker when advertising BGP Auto Discovery TLV. On reception, this flag should be used for selection or required iBGP peering candidates.

It is important to note that the actual state of eBGP session or present or not in the routing table of redistributed prefix is not relevant and this bit should be set always when eBGP session or local route origination is configured.

Referring to FIG. 6D, a sub-TLV 471 is for AFI/SAFI for reflection topologies. The Type is a one octet field set to value of 5. As before, the Length is a one octet field that indicates the length of this sub-TLV in octets. Subsequent four octets includes a two octet Address Family Identifier, one octet Subsequent Address Family Identifier, one octet of for AFI/SAFI flags, and four octets for a Cluster Identifier.

The O flag is set to indicate the originator or eBGP speaker as described above in reference to FIG. 6C. The R flag (or bit) is set to indicate a route reflector for a given AFI-SAFI/Cluster_ID combination.

When the R flag is set, the BGP speaker announcing this TLV is configured for route reflection function for a given AFI/SAFI combination. In addition, when the R flag is set the following cluster identifier four octet value indicates the cluster identifier assigned for a given reflection function.

Clients of route reflection will send their cluster identifier lists assigned to each AFI/SAFI without the R flag set. When client wishes to indicate the request to become a member of all possible cluster identifiers for given AFI/SAFI combination within a flooding scope of his BGP Auto Discovery TLV, the R flag should not be set and the value of cluster identifier associated with the AFI/SAFI should be set to all zeros.

To allow chain of route reflection (hierarchy) it is perfectly valid for a BGP speaker to have for a given AFI/SAFI with the R flag set for one cluster identifier (e.g., to perform a route reflection function) and at the same time for another cluster identifier be a client of other route reflectors (i.e., the R flag not set).

Network designs of reflection within confederations are also supported. Depending on the implementation, single sided signaling may be allowed only from route reflectors to the clients. When a client receives the BGP Auto Discovery TLV that contains the interested cluster identifier and has the R flag set, the client can initiate BGP Open without injecting any information about his own BGP configuration in the reflection topologies into the network.

FIG. 6E shows an example of the structure of sub-information relating to specifying an old BGP identifier. A sub-TLV 481 relates to an old BGP identifier.

The Type is a one octet field set to value of 6. The Length is a one octet field that indicates the length of this sub-TLV in octets. The next four octets is an old BGP identifier.

When the BGP identifier is being changed on a BGP speaker, the old BGP identifier should be the previously advertised BGP identifier for this given BGP speaker. Presence of this sub-TLV is an indication that the received BGP Auto Discovery TLV is being related to previously flooded BGP information for the old BGP Identifier.

Now that exemplary BGP peering information has been described, the following will discuss issues relating to different topologies.

For an iBGP auto mesh, each BGP speaker configured to participate in an iBGP auto mesh should pass to flooding component BGP Auto Discovery TLV with its own local configuration dependent information. On the receive side, a cache should be maintained by BGP with all received information from flooding component about other BGP speakers announcing their BGP Auto Discovery TLVs in a given area or domain.

iBGP auto mesh configuration should allow for per address family and subsequent address family disjoint topologies granularity. When multiple AFI/SAFI pairs match on any two BGP speakers only one iBGP session should be attempted. Regular BGP capabilities will be used to negotiate given AFI/SAFI mutual set. Nevertheless, AFI/SAFI granularity can be required to allow for very fine grade disjoint topologies for different types of distributed by BGP information.

For full mesh topologies (e.g., when an operator needs to fully or partially mesh BGP speakers), the AFI/SAFI for mesh topologies sub-TLV shown in FIG. 6C should be utilized. BGP speakers may be eligible for origination of routes or may be configured for eBGP peering. These BGP speakers can be called "O flag eligible" and may establish session with any other BGP speaker if passing all peering criteria for a given AFI/SAFI.

BGP speakers that are "O flag not eligible" (e.g., P routers) should not establish iBGP peering to any other "O flag not eligible" BGP speakers. One possible example of such a configuration could be VPNv4 AF connecting all PEs in a domain into a full iBGP mesh.

After reception of peers BGP Auto Discovery TLV BGP speaker should check for autonomous system numbers match as well as AFI/SAFI identifiers match. Positive results from the above actions should trigger a standard process of connection establishment attempt with the peer.

It is also highly recommended that a local range of allowed peering addressed be also maintained and consulted at each attempt to establish a new iBGP peering. BGP Auto Discovery TLV may be area/level or domain wide in full mesh topologies. The default can be area/level wide flooding.

With regard to confederations, to automate iBGP full mesh establishment in each confederation sub-AS, each confederation member should advertise its confederation sub-AS instead of the main AS (confederation identifier) it is a member of in the BGP Autonomous System sub-TLV shown in FIG. 5.

There could be two cases here: confederation sub-ASes strictly contained within flooding scope and confederation sub-ASes unrelated to flooding topology.

In the first case, BGP auto discovery TLV flooding scope should be limited to one area/level. In the second case, BGP auto discovery TLV flooding scope should be domain wide and the use of an auto peering range may be beneficial. An Auto Peering Range sub-TLV could be utilized (not shown) or the auto peering range can be a local configuration only to verify with whom a router is authorized to peer with through auto discover.

In the cases where reflectors are used within each confederation rather then direct peering, the AFI/SAFI for reflection topologies sub-TLV shown in FIG. 6D should be used instead of the AFI/SAFI for mesh topologies sub-TLV shown in FIG. 6C.

Continuing with route reflectors, when an operator wishes to automate establishment of BGP sessions to route reflectors, the only additional information required is configuration of at least one identical cluster identifier on both route reflector as well as on route reflector client. As mentioned earlier, even this requirement could be relaxed by implementation supporting single sided signaling of reflector capabilities. A potential drawback in such a case is that route reflector injecting his BGP Auto Discovery TLV may also need to be configured with an additional information allowing to distinguish BGP Open requests coming from clients as well as those coming from non clients based on the peering address range and mark such a peering accordingly. In other embodiments, an iBGP auto mesh with routers can be implemented utilizing closed IGP metric information.

Routers or devices designated to serve route reflector function should advertise their AFI/SAFI for reflection topologies sub-TLV shown in FIG. 6D with the R flag set as well as with their cluster identifier(s) attached.

If an iBGP session will be established between a route reflector (the R flag set) and a non route reflector BGP speaker (the R flag not set) who's specific AFI/SAFI cluster identifier matches on at least one entry with a given route reflector cluster identifier, it should be marked as route reflector client.

BGP speakers that are not to act as route reflectors (the R flag not set) and do not have configured cluster identifier value(s) indicating their designation as route reflector clients would attempt to establish regular iBGP peering to other BGP speakers in the domain (per rules described above relating to full mesh topologies). Another embodiment may also allow the additional route reflection client to client full mesh.

Route reflection chaining (reflector hierarchy) can be fully supported. A route reflector server may advertise for a given AFI/SAFI his ability to reflect routes for one set of cluster identifier(s) (the R flag set) and at the same time for the same AFI/SAFI value submit a list of cluster identifiers without the R flag set indicating the willingness to become a regular client on servers eligible to reflect those cluster identifiers.

When a client wishes to indicate the request to become a member of all possible cluster identifiers for given AFI/SAFI combination within a flooding scope of his BGP Auto Discovery TLV, the R flag should not be set and the value of cluster identifier associated with the AFI/SAFI should be set to all zeros.

It is highly recommended for an implementation to support local configuration of all possible remote peering address ranges expected to be received via BGP Auto Discovery TLV messages. In particular this can protect from configuration mistakes when peering in a full or partial mesh and setting flooding scope accidentally to domain wide.

In some embodiments, the local peering range list is not flooded to the remote peers. Such a flooding could further protect from even sending BGP Open message when given BGP speaker own peering address does not match received list from a peer. In other embodiments, the local peering range list is flooded to the remote peers and a new sub-TLV for flooding this information can be utilized.

Deployment of embodiments of the invention should be rather seamless. It is expected that embodiments can still allow manual neighbor establishments, which in fact could be complimentary and co-existing to the iBGP auto mesh.

In addition, BGP Auto Discovery TLV exchange could be enabled just for informational purposes while provisioning would remain manual before operational teams get familiar with new functionality (see, e.g., step 306 of FIG. 3).

Incremental deployment with enabling just a few routers to advertise BGP Auto Discovery TLV while maintaining manual configuration based peering with the rest of the network can also be achieved. An implementation may also allow for mixed peering for example reflector client being configured automatically while reflector's clusters itself being interconnected manually.

While the above is a complete description of preferred embodiments of the invention, various alternatives, modifications, and equivalents can be used. It should be evident that the invention is equally applicable by making appropriate modifications to the embodiments described above. For example, although the invention has been described in relation to specific embodiments, the invention can be advantageously applied to other embodiments. Therefore, the above description should not be taken as limiting the scope of the invention as defined by the metes and bounds of the appended claims along with their full scope of equivalents

The invention claimed is:

1. A method of establishing a BGP (Border Gateway Protocol) mesh in a network, comprising:
    receiving BGP peering information flooded from a BGP speaker, the BGP peering information comprising a BGP identifier and static configuration parameters used to establish a BGP peering session;
    automatically discovering at least one neighbor utilizing said received BGP peering information; and
    automatically establishing said BGP peering session with said at least one neighbor to establish a BGP mesh.

2. The method of claim 1, wherein the network device is a router or route reflector.

3. The method of claim 1, wherein the BGP peering information comprises a flooding protocol.

4. The method of claim 3, wherein the flooding protocol is OSPF or ISIS.

5. The method of claim 1, wherein the BGP peering information comprises a flooding scope.

6. The method of claim 1, wherein the BGP peering information comprises an autosynchronous system (AS) number or confederation sub-AS number.

7. The method of claim 1, wherein the BGP peering information comprises a force new peering flag and a new peering address.

8. The method of claim 1, wherein the BGP peering information comprises an originator flag.

9. The method of claim 8, wherein the BGP peering information comprises an address family identifier.

10. The method of claim 1, wherein the BGP peering information comprises a route reflector flag.

11. The method of claim 10, wherein the BGP peering information comprises an address family identifier.

12. The method of claim 10, wherein the BGP peering information comprises a cluster identifier.

13. The method of claim 1, wherein the BGP peering information comprises an old BGP identifier.

14. The method of claim 1, wherein the BGP mesh is an iBGP mesh.

15. A network system that establishes a BGP (Border Gateway Protocol) mesh in a network, comprising:
    a first network device flooding BGP peering information comprising a BGP identifier and static configuration parameters used to establish a BGP peering session; and
    at least one other network device that receives the BGP peering information, automatically discovers at least one neighbor utilizing said received BGP peering information, and automatically establishes said BGP session with the at least one neighbor to establish a BGP mesh;
    wherein at least one of the network devices is a BGP speaker.

16. A computer-readable storage medium encoded with a computer program that establishes a BGP (Border Gateway Protocol) mesh in a network, the computer program comprising:
    computer code that configures a processor to receive BGP peering information flooded from a BGP speaker, the BGP peering information comprising a BGP identifier and static configuration parameters used to establish a BGP peering session;
    computer code that configures a processor to automatically discover at least one neighbor utilizing said received BGP peering information; and computer code that automatically establishes said BGP session with the at least one neighbor to establish a BGP mesh.

17. A network system that establishes a BGP (Border Gateway Protocol) mesh in a network, comprising:
means for receiving BGP peering information flooded from a BGP speaker, the BGP peering information comprising a BGP identifier and static configuration parameters used to establish a BGP peering session;
means for automatically discovering at least one neighbor utilizing said received BGP peering information; and
a means for automatically establishing said BGP session with the at least one neighbor to establish a BGP mesh.

18. A method of establishing a BGP (Border Gateway Protocol) mesh in a network, comprising:
receiving BGP peering information from a BGP speaker, the BGP peering information comprising a BGP identifier and static configuration parameters used to establish a BGP peering session;
analyzing the BGP peering information to identify at least one neighbor;
performing a BGP session with the at least one neighbor to establish a BGP mesh; and
flooding the received BGP peering information to at least one other network device.

19. A network system that establishes a BGP (Border Gateway Protocol) mesh in a network, comprising:
a first network device that receives BGP peering information, the BGP peering information comprising a BGP identifier and static configuration parameters used to establish a BGP peering session, analyzes the BGP peering information to identify at least one neighbor, performs a BGP session with the at least one neighbor to establish a BGP mesh, and floods the BGP peering information; and
a second network device that receives the BGP peering information from the first network device;
wherein at least one of the network devices is a BGP speaker.

20. A computer-readable storage medium encoded with a computer program that establishes a BGP (Border Gateway Protocol) mesh in a network, the computer program comprising:
computer code that receives BGP peering information, the BGP peering information comprising a BGP identifier and static configuration parameters used to establish a BGP peering session;
computer code that analyzes the BGP peering information to identify at least one neighbor;
computer code that performs a BGP session with the at least one neighbor to establish a BGP mesh; and
computer code that floods the BGP peering information.

21. A network system that establishes a BGP (Border Gateway Protocol) mesh in a network, comprising:
means for receiving BGP peering information, the BGP peering information comprising a BGP identifier and static configuration parameters used to establish a BGP peering session;
means for analyzing the BGP peering information to identify at least one neighbor;
means for performing a BGP session with the at least one neighbor to establish a BGP mesh; and
means for flooding the received BGP peering information.

22. A method of establishing an iBGP (internal Border Gateway Protocol) mesh in a network, comprising:
receiving iBGP peering information flooded from a BGP speaker, the BGP peering information comprising a BGP identifier and static configuration parameters used to establish an iBGP peering session;
automatically discovering at least one neighbor utilizing said received BGP peering information; and
automatically establishing said iBGP session with the at least one neighbor to establish an iBGP mesh.

23. A network system that establishes an iBGP (internal Border Gateway Protocol) mesh in a network, comprising:
a first network device flooding iBGP peering information comprising a BGP identifier and static configuration parameters used to establish an iBGP peering session; and
at least one other network device that receives the iBGP peering information, automatically discovers at least one neighbor utilizing said received BGP peering information, and automatically establishes said iBGP session with the at least one neighbor to establish an iBGP mesh;
wherein at least one of the network devices is a BGP speaker.

24. A computer-readable storage medium encoded with a computer program that establishes an iBGP (internal Border Gateway Protocol) mesh in a network, the computer program comprising:
computer code that configures a processor to receive iBGP peering information flooded from a BGP speaker, the iBGP peering information comprising a BGP identifier and static configuration parameters used to establish an iBGP peering session;
computer code that configures a processor to automatically discover at least one neighbor utilizing said received BGP peering information; and
computer code that automatically establishes said iBGP session with the at least one neighbor to establish an iBGP mesh.

25. A network system that establishes an iBGP (internal Border Gateway Protocol) mesh in a network, comprising:
means for receiving iBGP peering information flooded from a BGP speaker, the iBGP peering information comprising a BGP identifier and static configuration parameters used to establish an iBGP peering session;
means for automatically discovering at least one neighbor utilizing said received BGP peering information; and
means for automatically establishing said iBGP session with the at least one neighbor to establish an iBGP mesh.

* * * * *